United States Patent [19]

Sullivan

[11] Patent Number: 4,867,281
[45] Date of Patent: Sep. 19, 1989

[54] SELF-ADJUSTING BRAKE ACTUATOR

[75] Inventor: James L. Sullivan, Rochester, Mich.

[73] Assignee: Rockwell International Corporation, Pittsburgh, Pa.

[21] Appl. No.: 249,926

[22] Filed: Sep. 27, 1988

[51] Int. Cl.$^4$ .................. F16D 51/00; F16D 65/38
[52] U.S. Cl. ........................... 188/79.62; 188/196 A
[58] Field of Search ............ 188/79.51, 79.62, 196 A, 188/351, 364, 196 D, 196 V, 196 C; 192/111 A

[56] References Cited

U.S. PATENT DOCUMENTS

| | | | |
|---|---|---|---|
| 2,140,752 | 12/1938 | La Brie | 188/79.51 X |
| 2,208,042 | 7/1940 | Nothiger | 188/79.51 X |
| 2,345,108 | 3/1944 | Goepfrich | 188/364 X |
| 2,867,089 | 1/1959 | Parmerlee | 188/196 A X |
| 2,928,508 | 3/1960 | Rockwell | 188/196 A X |
| 4,416,356 | 11/1983 | Osborne | 188/364 X |

*Primary Examiner*—Robert J. Oberleitner

[57] ABSTRACT

A self-adjusting actuator is disclosed that utilizes a hydraulic system for adding necessary brake fluid to move brake actuating pistons sufficiently to bring brake linings into contact with a brake drum, regardless of how much wear has taken place on the linings. The self-adjusting actuator also incorporates a threaded plunger sleeve, interposed between an actuating piston and the brake shoes, to limit the retaction of the shoes away from the brake drum so as to maintain the proper running clearance after adjustment. The system incorporates a compensator piston having one face acting on incompressible brake fluid filling the chamber between the compensator piston, the actuating piston and a surrounding housing. An opposite face of the compensator is acted upon by pressurized brake fluid when the operator of the vehicle depresses the brake pedal. A normally closed valve is incorporated into the compensator piston such that, as the compensator piston approaches the end of its stroke, the valve is opened thereby allowing the brake fluid acting on the second side of the compensator piston to pass through the compensator piston and into the chamber.

24 Claims, 5 Drawing Sheets

SELF-ADJUSTING BRAKE ACTUATOR

BACKGROUND OF THE INVENTION

The present invention relates to an actuator for a hydraulic brake, more particularly, such an actuator having a self-adjusting feature to compensate for brake lining wear.

Drum brakes are, of course, well known in the art and typically comprise a pair of brake shoes mounted on a stationary backing plate with a drum rotatably surrounding the brake shoes. The shoes have friction material mounted on their outer surface and means are provided to move the brake shoes radially outwardly until the friction material contacts the interior surface of the brake drum. In a hydraulically actuated system, hydraulically actuated pistons are utilized to move the brake shoes radially outwardly. Return springs are utilized to withdraw the brake shoes from contact with the brake drum.

In large heavy-duty trucks and off-road vehicles, the brake shoes may be attached to a brake spider casting instead of the backing plate. The brake spider casting may define actuating piston cylinders on diametrically opposite sides which contain the brake shoe actuating pistons and plungers. In known systems the pistons are actuated by a hydraulically movable wedge to move the brake shoes radially outwardly into contact with the brake drum. A plunger assembly interposed between the brake shoes and the actuating pistons provides means to adjust the positions of the brake shoes so as to compensate for brake lining wear.

Quite obviously, as the thicknesses of the brake linings decrease, adjustment means must be provided to adjust the relative positions between the brake shoes and the actuating pistons. Typically, known systems have utilized a mechanical system involving threaded plungers interposed between the actuating pistons and the brake shoes to provide the necessary adjustment. However, these devices have not proven totally satisfactory in reliably adjusting the brake linings relative to the brake shoes in order to maintain the proper running clearance. When used on such heavy-duty equipment, the brakes are, of necessity, subjected to rather abusive operating conditions. The purely mechanical nature of the prior art adjusting systems are all subject to corrosion, increased friction in the working components, etc. All of these factors contribute to the limited success of such prior art systems in achieving a reliable brake adjustment system.

SUMMARY OF THE INVENTION

The present invention relates to a self-adjusting actuator that utilizes a hydraulic system for providing the necessary brake fluid to move the actuating pistons sufficiently to bring the brake linings into contact with the brake drum, regardless of how much wear has taken place on the linings. The self-adjusting actuator also incorporates a threaded plunger sleeve, interposed between the actuating pistons and the brake shoes, to limit the retraction of the shoes away from the brake drum so as to maintain the proper running clearance. Any additional actuating brake fluid introduced to move the actuating pistons is retained enabling subsequent brake operation in the normal fashion.

The self-adjusting actuator according to the invention may be incorporated into the brake spider casting such that pressurizing a brake fluid acting on an actuating piston having a plunger extending therefrom bearing against the brake shoe serves to urge the brake shoe outwardly into contact with the brake drum. Return springs connecting the brake shoe to the brake spider casting exert a sufficient force on the shoes to withdraw them away from the brake drum upon release of the hydraulic pressure. The system incorporates a compensator piston having a first face acting on incompressible brake fluid filling a chamber defined by the compensator piston, the actuating pistons and a surrounding housing. Since the brake fluid is incompressible, any movement of the compensator piston will cause movement of the actuating pistons.

An opposite, second face of the compensator piston is acted upon by pressurized brake fluid when the operator of the vehicle depresses the brake pedal. Such action causes the pressure to increase on the second face of the compensator piston, thereby urging it against the entrapped brake fluid and causing consequent movement of the actuating pistons.

A normally closed valve is incorporated into the compensator piston such that, as the compensator piston approaches the end of its stroke, the valve is opened, thereby allowing the brake fluid acting on the second face of the compensator piston to pass through the compensator piston and into the chamber. Thus, if the actuating pistons have not brought the brake shoes into contact with the brake drum as the compensator piston approaches the end of its travel, the valve is opened, thereby allowing pressurized fluid to pass through the piston, into the chamber and to continue the movement of the actuating pistons until the brake shoes contact the brake drum.

Upon release of the actuating pressure by the vehicle operator, the compensator piston returns to its initial position while closing the valve to prevent the escape of any fluid from the chamber. As the compensator piston is withdrawn, the actuating pistons are also withdrawn due to the force exerted thereon by the return springs attached to the brake shoes. However, the system according to the invention incorporates means to limit the return stroke of the actuating pistons to a distance that will provide an adequate running clearance between the brake linings and the brake drum. A rotatable sleeve is rotatably attached to the plunger interconnecting the actuating piston with the brake shoe. The sleeve is also threadingly engaged with a non-rotatable locking ring. As the piston moves outwardly to bring the brake lining into contact with the brake drum, the linear movement of the sleeve relative to the locking ring causes it to rotate about the plunger. The locking ring is attached to the actuator housing such that it may undergo limited axial movement, the amount of such movement being equal to the desired running clearance. Thus, as the actuating pistons are withdrawn, the sleeves are prevented from rotation in the reverse direction, thereby limiting the axial return movement of the sleeves, the plungers and the pistons to the limited axial movement of the locking ring.

Thus, once the additional brake fluid has moved the brake shoes outwardly a sufficient distance to contact the brake drum, the sleeves will limit the retraction movement so as to maintain the running clearance. The entrapment of the extra fluid in the chamber enables the brakes to function in a fully normal fashion the next time they are actuated.

DETAILED DESCRIPTION OF THE PREFERRED EMBODIMENTS

Figure 1:
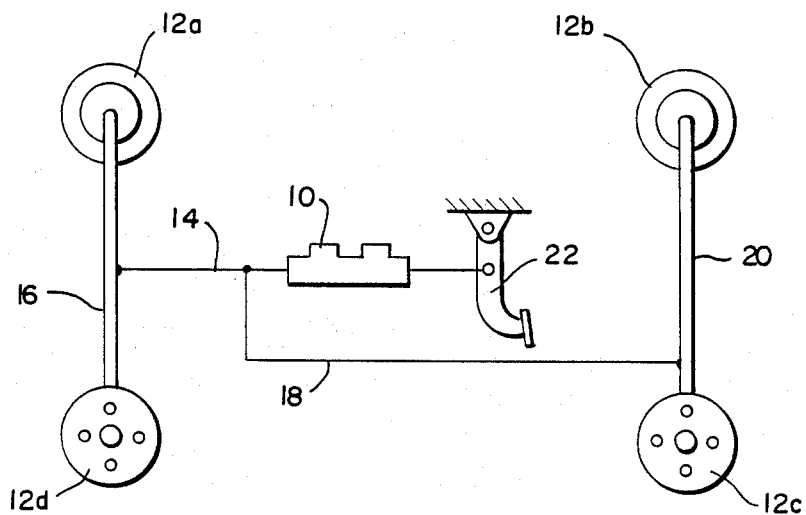
FIG. 1 is a schematic representation of a typical hydraulic brake system utilizing a master cylinder to supply brake fluid to the system.

FIG. 1 schematically illustrates a typical hydraulic brake system wherein master cylinder 10 is connected to brakes 12a, 12b, 12c and 12d via brake lines 14, 16, 18 and 20. The fluid in master cylinder 10 and brake lines 14, 16, 18 and 20 is pressurized via a piston located internally of the master cylinder 10 that is actuated by movement of brake pedal 22. Although only four brakes are illustrated, quite obviously the system can be used with any number of brakes, depending upon the size of the vehicle.

Figure 2:
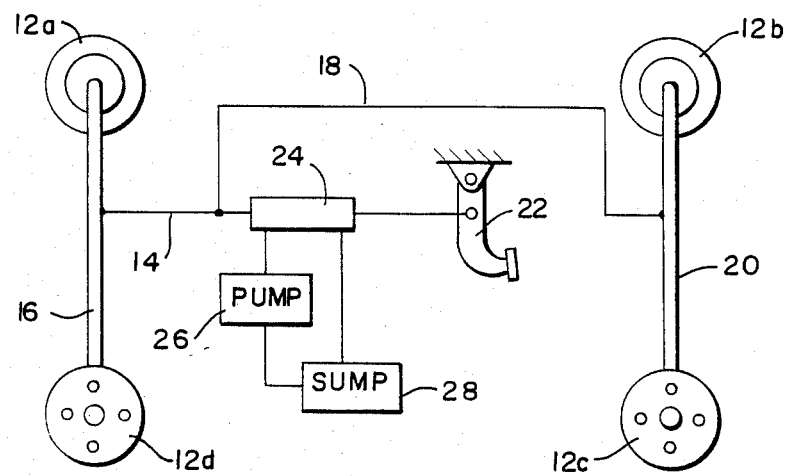
FIG. 2 is a schematic diagram of a typical hydraulic brake system utilizing a constant supply pump to supply the brake fluid to the system.

In large earth moving or off-road vehicles, the master cylinder 10 may be replaced by a valve 24 as illustrated in FIG. 2. A constant supply pump 26 circulates incompressible brake fluid between the valve 24 and a sump 28. When brake pedal 22 is depressed, valve 24 directs the fluid from pump 26 into the brake line conduits 14, 16, 18 and 20 in order to pressurize the fluid and apply the brakes.

Figure 3:
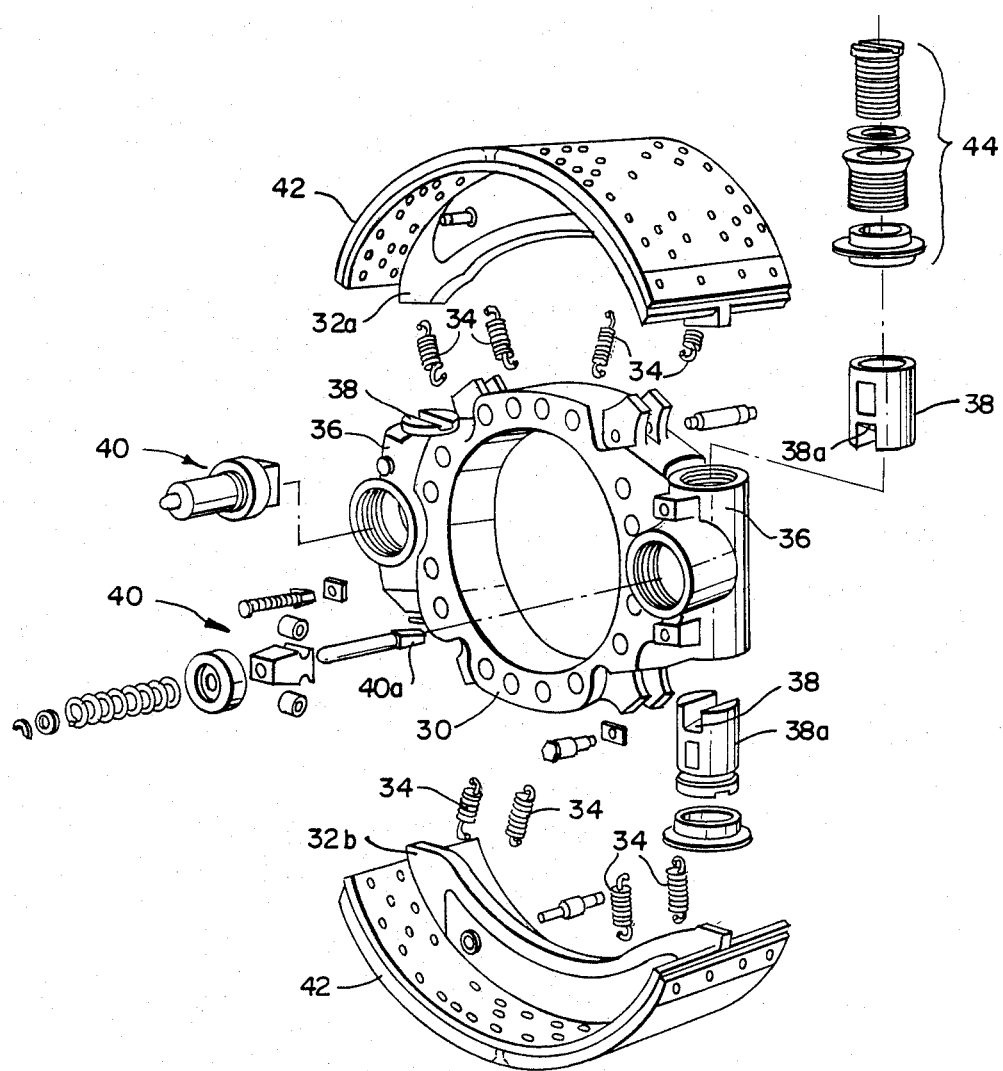
FIG. 3 is an exploded, perspective view showing the brake spider casting, the brake shoes and the actuating system of the prior art devices.

In large vehicle applications, the individual brake structures may comprise, as illustrated in FIG. 3, a brake spider casting 30 having brake shoes 32a and 32b attached thereto via return springs 34. Brake spider casting 30 defines cylinders 36 located on opposite sides adjacent to the ends of the brake shoes 32a and 32b. Brake actuating pistons 38 are slidably disposed in the cylinders 36 and are caused to move outwardly towards the ends of the cylinders 36 by hydraulic actuated wedge assembly 40. The wedge assemblies 40 are interconnected to the brake line conduits illustrated in FIGS. 1 or 2, such that an increase in the hydraulic pressure will urge the actuating wedges 40a against actuating piston ramp surfaces 38a to thereby urge the pistons 38 outwardly. When the hydraulic pressure is released, springs 34 urge the brake shoes 32a and 32b against the pistons 38 so as to withdraw the friction linings 42 out of contact with the brake drum (not shown).

Each of the actuator pistons 38 has plunger assembly 44 extending between it and the brake shoes 32a or 32b. The plunger assembly 44 incorporates a mechanical adjustment system which, in known fashion, mechanically adjusts the position of the brake shoes with respect to the piston to maintain a desired running clearance between the linings 42 and the brake drum.

Figure 4:
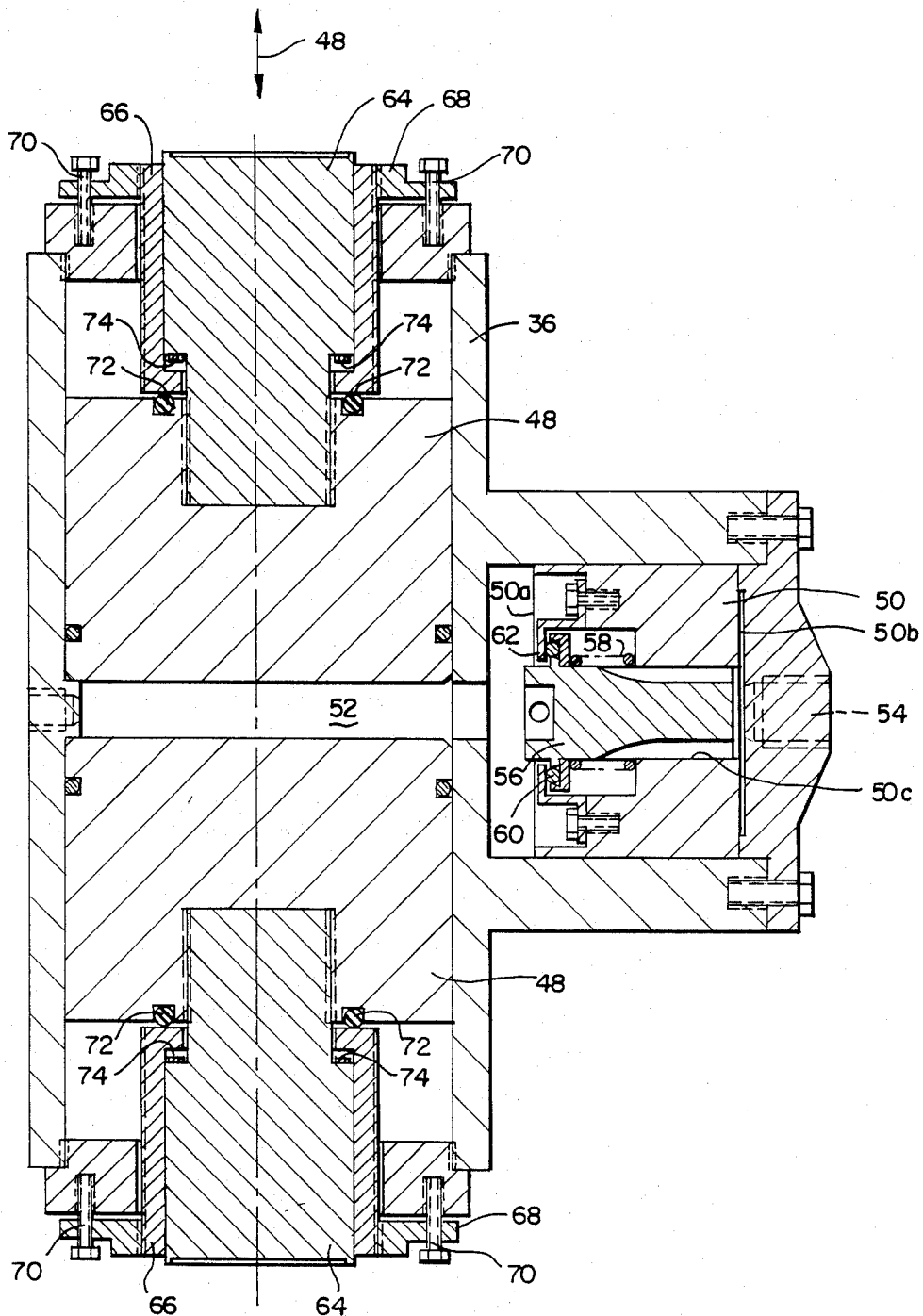
FIG. 4 is a cross-sectional view showing the self-adjusting actuator according to the invention with the actuating pistons retracted.
Figure 5:
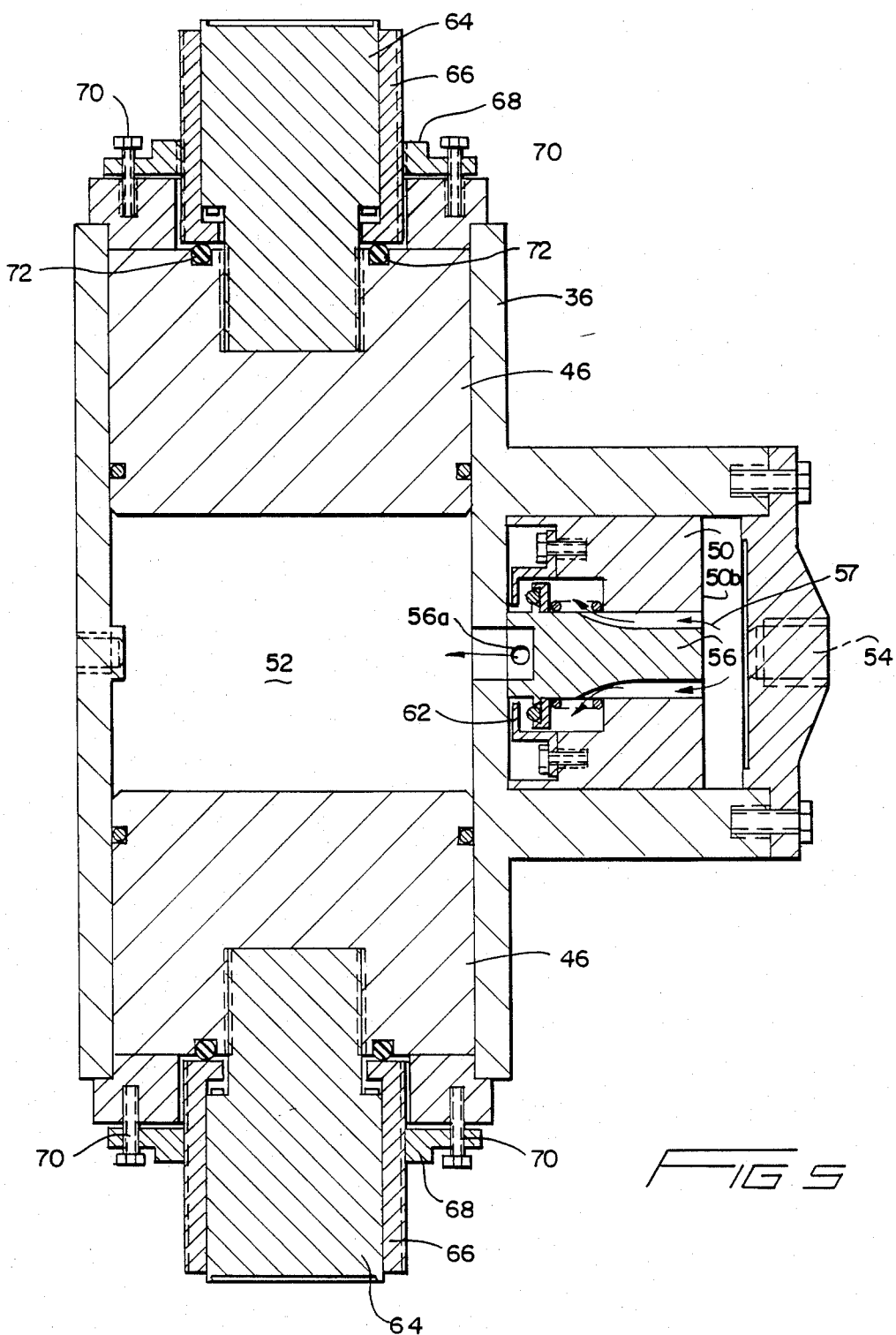
FIG. 5 is a cross-sectional view similar to that shown in FIG. 4 with the actuating pistons extended.

A cross-sectional view taken through cylinders 36 illustrating the self-adjusting brake actuator according to the invention is shown in FIGS. 4 and 5. Actuating pistons 46 are slidably mounted within cylinder 36 so as to move in the directions of arrows 48, generally parallel to the longitudinal axis of cylinder 36. Compensator piston 50 is slidably mounted in a lateral extension of cylinder 36 and has a first face 50a bearing against the incompressable brake fluid which fills chamber 52 defined by cylinder 36, pistons 46 and compensator piston 50. A second face 50b of compensator piston 50 is acted upon by a pressurized brake fluid passing through main brake fluid inlet 54 which is connected to one of the brake line conduits.

Compensator piston 50 also defines a central passage 50c in which valve member 56 is slidably mounted. Valve member 56 is acted upon by spring 58 such that valve seal 60 normally bears against valve seat 62, attached to compensator piston 50, such that the passageway 50c extending through compensator piston 50 is normally closed. Thus, as pressurized brake fluid passes through main inlet 54, it acts on second surface 50b of the compensator piston 50 to urge the compensator piston toward the left, as viewed in FIGS. 4 and 5. This movement of the compensator piston 50 increases the pressure on the fluid in chamber 52 thereby urging the actuator pistons 46 outwardly toward the ends of cylinder 36.

Plungers 64 are fixedly attached to each of the pistons 46 via a threaded connection or the like. The outer, exposed surface of plungers 64 bears against the ends of the brake shoes 32a or 32b such that, as actuating pistons 46 are moved outwardly, the brake shoes are correspondingly moved radially outwardly in order to bring the brake linings 42 into contact with the brake drum (not shown).

If the clearance between the brake linings and the brake drum is excessive, the compensator piston 50 will approach the end of its stroke before the linings 42 come into contact with the drum. The end of valve member 56 extends outwardly beyond the plane of the face 50a of the compensator piston such that it will contact the wall defining the end of the compensator piston cylinder before the face 50a of the compensator piston. Once this transpires, continued movement of compensator piston 50 toward the left will move the valve member 56 relative to the compensator piston 50, overcoming the biasing force of spring 58 and unseating valve seal member 60 from seat 62, as illustrated in FIG. 5. Once valve member 56 has been unseated, pressurized brake fluid will pass around the valve member 56 as indicated by the arrows 57 in FIG. 5, and enter chamber 52 via openings 56a formed in the valve member 56. Thus, the continued influx of pressurized brake fluid will continue the outward movement of pistons 46 until the brake linings contact the brake drum.

The self-adjusting actuator according to this invention also incorporates means to limit the return or retraction movement of the actuating pistons 46 so as to maintain the desired running clearance between the brake linings and the brake drum when the brake pressure has been released. Sleeve members 66 are mounted on plungers 64 so as to rotate with respect thereto and to be capable of limited axial movement with respect to the plungers. The sleeve members 66 have externally threaded outer surfaces that are threadingly engaged with a correspondingly threaded surface formed on locking rings 68. Locking rings 68 are attached to ends of cylinder 36 such that they may undergo limited axial movement with respect to the cylinder, but are not capable of any rotational movement. Stop members 70 slidably extend through a portion of the locking rings 68 and may be threadingly engaged with the ends of the cylinder 36. Stop members 70 have enlarged head portions axially spaced from the locking rings so as to define a gap therebetween. The enlarged head portion serves to limit the axial movement of the locking ring in an outward direction. The gap is dimensioned so as to provide the proper running clearance between the brake lining and the brake drum.

Figure 6:
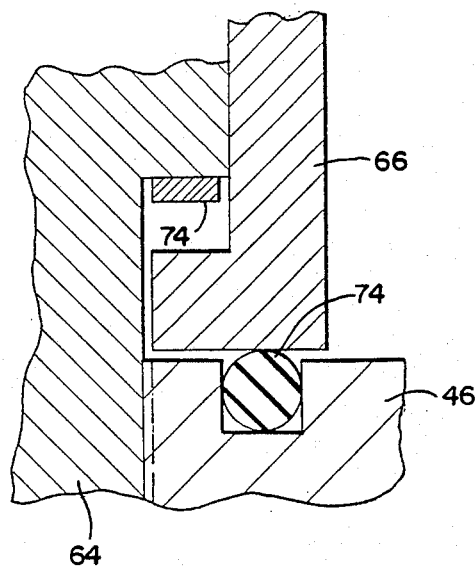
FIG. 6 is an enlarged, partial view illustrating the junction of the actuating piston and the sleeve during the actuating stroke of the piston.

During the brake application stroke of the actuating pistons 46, the axial movement of the sleeve members 66 with respect to the locking rings 68 impart a rotation to the sleeve members 66 due to the threaded interconnection between these elements. To facilitate the rotation of the sleeve members 66, ball bearings 72 are interposed between the actuating pistons 46 and the inner end of the sleeve members 66 as seen in FIG. 6. The ball bearings 72 serve to minimize the friction between the actuating piston 46 and the sleeve member 66 so as to minimize the forces necessary to cause its rotation. During initial outward movement of the actuating pistons 46, the locking rings 68 will move axially until they contact the enlarged headed portions of stop members 70. At that point any further axial movement in an outward direction is prohibited and an additional axial movement of the actuating pistons 46 causes the sleeve members 66 to rotate with respect to the locking rings 68.

When the incoming brake fluid pressure is released, the pressure in chamber 52, due to the force of the brake shoe return springs acting on actuating pistons 46 via the brake shoes, will exceed the pressure of the incoming brake fluid and thereby urge the compensator piston 50 toward the right as illustrated in FIGS. 4 and 5. Once the compensator piston 50 moves a short distance, valve member 56 will again close, thereby prohibiting the escape of the additional fluid added to chamber 52. The pressure differential between the fluid pressure in chamber 52 and that of the incoming brake fluid will cause compensator piston 50 to return to its original position, illustrated in FIG. 4.

Figure 7:
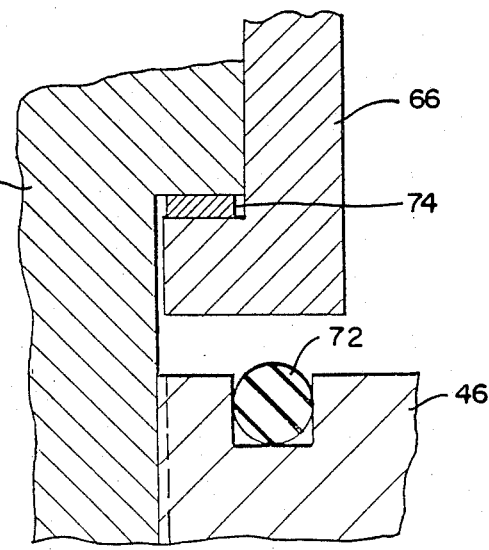
FIG. 7 is an enlarged, partial, cross-sectional view similar to FIG. 6 showing the relationship of the actuating piston and the sleeve during the retraction stroke of the piston.

Initial retraction of actuating pistons 46 will cause the locking rings 68 to move axially away from enlarged headed portions of stop members 70 and into contact with the end of the cylinder 36. Since further axial movement of the locking ring 68 is prohibited, actuating pistons 46 and plungers 64 will move axially with respect to the sleeves 66 until high friction elements 74 come into contact with the flange formed on the end of sleeves 66, as illustrated in FIG. 7. The high-friction elements, which may comprise material similar to brake linings or clutch linings, prevent rotation of the sleeves 66 with respect to the plungers 64. Since sleeves 66 may not rotate, and since locking rings 68 cannot move further axially inwardly, any additional inward movement of the actuating pistons 46 and plungers 64 is thereby prevented. The limited retracting movement of the elements serves to withdraw the brake linings from contact with the brake drum and to provide a running clearance between these elements.

Figure 8:
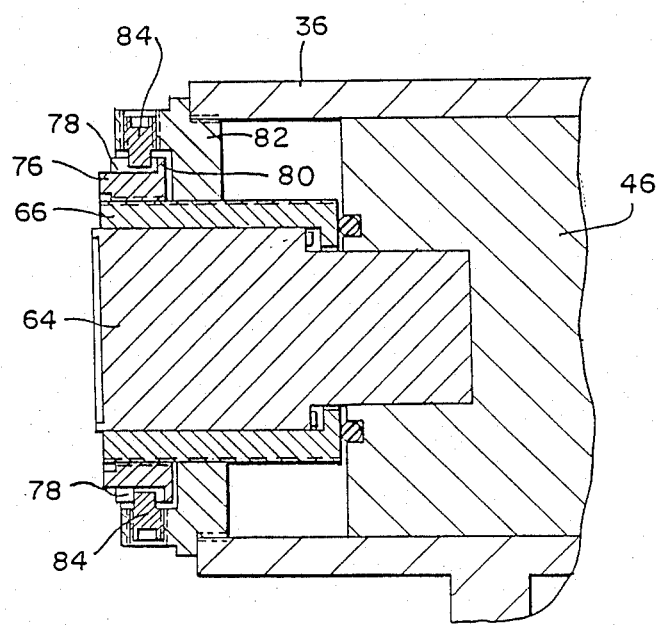
FIG. 8 is a partial, cross-sectional view illustrating an alternative embodiment of the locking ring.

An alternative embodiment of the locking ring is illustrated in FIG. 8. In this embodiment, locking ring 76 is threadingly engaged with the sleeve member 66 and defines one or more slots 78 that extend in an axial direction partially along the axial dimension of a locking ring 76. The end of the slot 78 defines a shoulder 80 on the locking ring member. Cylinder end portion 82, fixedly attached to cylinder 36 defines at least one opening into which stop member 84 is threadingly engaged. Stop member 84 has an end portion that extends beyond the cylinder end 82 and into the slot 78 defined in the locking ring 76. Thus, interengagement of the stop member 84 with the slot 78 will allow the locking ring member to move axially a small amount, but will prohibit any relative rotation. The movement of the shoulder 80 between the stop member 84 and the cylinder end portion 82 determines the amount of axial movement the system may undergo during the retraction stroke. The operation of the embodiment illustrated in FIG. 8 is exactly the same as that previously described.

The foregoing description is provided for illustrative purposes only and should not construed as in any way limiting this invention, the scope of which is defined solely by the appended claims.

What is claimed is:

1. A self-adjusting actuator for a brake having a brake drum, at least one brake shoe and friction brake lining attached to the brake shoe comprising:
   (a) an actuator housing defining a cylinder;
   (b) at least one actuating piston movable along an axis and located in the cylinder such that one side of the actuating piston and an interior surface of the cylinder define a normally closed chamber;
   (c) an incompressible fluid located in and filling the chamber;
   (d) compensator piston means having a first face operatively acting on the incompressible fluid in the chamber such that movement of the compensator piston means in a first direction pressurizes the fluid in the chamber, thereby moving the actuating piston along the axis relative to the cylinder in an actuation stroke;
   (e) means to move the compensator piston means in the first direction;
   (f) plunger means connecting the actuating piston to the brake shoe such that the actuation stroke of the piston moves the friction brake lining toward the brake drum;
   (g) means to add additional incompressible fluid to the normally closed chamber during the actuation stroke if the movement of the compensator piston in the first direction exceeds a predetermined amount until the friction brake lining contacts the brake drum; and,
   (h) self-adjusting means acting on the plunger means to limit the axial return movement of the at least one actuating piston after the incompressible fluid has been de-pressurized so as to maintain a predetermined running clearance between the friction brake lining and the brake drum wherein the self-adjusting means comprises:
      (i) a sleeve member operatively associated with the plunger means so as to rotate with respect to the plunger means;
      (ii) means to rotate the sleeve member during the actuation stroke of the actuating piston; and,
      (iii) means operatively associated with the sleeve member to limit the return axial movement of the actuating piston.

2. The self-adjusting brake actuator according to claim 1 wherein the means to move the compensator piston in the first direction comprises:
(a) a second face defined by the compensator piston; and,
(b) a source of pressurized, incompressible fluid acting on the second face of the compensator piston.

3. The self-adjusting brake actuator according to claim 2 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

4. The self-adjusting brake actuator according to claim 3 wherein the valve means comprises:
(a) a valve seat defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

5. The self-adjusting brake actuator according to claim 1 wherein the means to rotate the sleeve member comprises:
(a) a threaded portion formed on the sleeve member; and,
(b) a locking ring member non-rotably attached to the housing and threadingly engaging the threaded portion of the sleeve member such that relative axial movement therebetween causes the sleeve member to rotate.

6. The self-adjusting brake actuator according to claim 5 wherein the means to limit the return axial movement of the piston comprises:
(a) a high friction element contacting the sleeve member and the plunger during a retraction stroke of the piston so as to prevent relative rotation therebetween; and,
(b) means attaching the locking ring member to the housing such that the locking ring member may undergo limited axial movement with respect to the housing.

7. The self-adjusting brake actuator according to claim 6 further comprising anti-friction bearing means operatively interposed between the sleeve member and the piston during the actuation stroke of the piston to facilitate rotation of the sleeve member.

8. The self-adjusting brake actuator according to claim 7 wherein the means attaching the locking ring member to the housing comprises:
(a) a first stop member fixedly attached to the housing; and,
(b) at least one second stop member attached to the first stop member and extending through the locking ring member, the second stop member having an enlarged head portion spaced from the first stop member so as to define a gap therebetween, the head portion and the first stop member serving to define the limits of axial movement of the locking ring member.

9. The self-adjusting brake actuator according to claim 8 wherein the means to move the compensator piston in the first direction comprises:
(a) a second face defined by the compensator piston; and,
(b) a source of pressurized, incompressible fluid acting on the second face of the compensator piston.

10. The self-adjusting brake actuator according to claim 9 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

11. The self-adjusting brake actuator according to claim 10 wherein the valve means comprises:
(a) a valve seat defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

12. The self-adjusting brake actuator according to claim 7 wherein the means attaching the locking ring member to the housing comprises:
(a) a first stop member fixedly attached to the housing;
(b) at least one slot extending axially along only a portion of an axial dimension of the locking ring member, an end of the slot defining a shoulder; and,
(c) at least one second stop member attached to the first stop member and having a stop portion extending into the slot spaced from the first stop member such that the shoulder is located between the first and second stop members so as to limit the axial movement of the locking ring member.

13. The self-adjusting brake actuator according to claim 12 wherein the means to move the compensator piston in the first direction comprises:
(a) a second face defined by the compensator piston; and,
(b) a source of pressurized, incompressible fluid acting on the second face of the compensator piston.

14. The self-adjusting brake actuator according to claim 13 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

15. The self-adjusting brake actuator according to claim 14 wherein the valve means comprises:
(a) a valve seat defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

16. The self-adjusting brake actuator according to claim 7 wherein the means to move the compensator piston in the first direction comprises:
(a) a second face defined by the compensator piston; and,
(b) a source of pressurized, incompressible fluid acting on the second face of the compensator piston.

17. The self-adjusting brake actuator according to claim 16 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

18. The self-adjusting brake actuator according to claim 17 wherein the valve means comprises:
(a) a valve seat defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

19. The self-adjusting brake actuator according to claim 6 wherein the means to move the compensator piston in the first direction comprises:
(a) a second face defined by the compensator piston; and,
(b) a source of pressurized, incompressible fluid acting on the second face of the compensator piston.

20. The self-adjusting brake actuator according to claim 19 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

21. The self-adjusting brake actuator according to claim 20 wherein the valve means comprises:
(a) a valve set defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

22. The self-adjusting brake actuator according to claim 5 wherein the means to move the compensator piston in the first direction comprises:
(a) a second face defined by the compensator piston; and,
(b) a source of pressurized, incompressible fluid acting on the second face of the compensator piston.

23. The self-adjusting brake actuator according to claim 22 wherein the means to add additional incompressible fluid to the chamber comprises:
(a) fluid passage means defined by the compensator piston extending between the first and second faces;
(b) valve means normally closing the fluid passage means; and,
(c) means to open the valve means thereby opening the fluid passage means after the compensator piston has moved a predetermined distance thereby allowing incompressible fluid from the source to pass into the chamber.

24. The self-adjusting brake actuator according to claim 23 wherein the valve means comprises:
(a) a valve seat defined by the compensator piston;
(b) a valve member slidably located in the passage means such that an end portion extends outwardly beyond a plane of the first face of the compensator piston; and,
(c) spring means interposed between the compensator piston and the valve member normally biasing the valve member into sealing contact with the valve seat.

* * * * *